United States Patent [19]

Caenazzo

[11] Patent Number: 5,638,148
[45] Date of Patent: Jun. 10, 1997

[54] HINGE FOR SPECTACLES HAVING RESILIENT MECHANISM CONTAINED IN STATIONARY PART ASSOCIATED WITH FRAME

[75] Inventor: Alessandro Caenazzo, Via Vittorio Veneto 79, 31020 S. Vendemiano (TV), Italy

[73] Assignees: Alessandro Caenazzo; Silvana Pasqualotto, both of S. Vendemiano, Italy

[21] Appl. No.: 595,245

[22] Filed: Feb. 1, 1996

[30] Foreign Application Priority Data

Feb. 17, 1995 [IT] Italy ................... UD95A0026

[51] Int. Cl.$^6$ ................................................ G02C 5/22
[52] U.S. Cl. ................................. 351/153; 16/228
[58] Field of Search .......................... 351/153, 113, 351/114, 140, 41, 111; 16/228

[56] References Cited

FOREIGN PATENT DOCUMENTS

| 792 135 | 11/1972 | Belgium . |
|---|---|---|
| 239010 | 9/1987 | European Pat. Off. . |
| 266307 | 5/1988 | European Pat. Off. . |
| 2079614 | 10/1971 | France . |
| 2334808 | 10/1975 | France . |
| 2340026 | 1/1977 | France . |

*Primary Examiner*—Hung X. Dang
*Attorney, Agent, or Firm*—Antonelli, Terry, Stout & Kraus, LLP

[57] ABSTRACT

Resilient hinge for spectacles to connect the legs (14) and frame (11) in a pair of spectacles, the hinge including a stationary part (27) associated with the frame (11) and a movable part (29) associated with the leg (14), the movable part (29) comprising a cam element (13) containing terminally a vertical transverse through hole (25a), the stationary part (27) comprising a containing body (15) defining a first internal longitudinal seating (16), with which there cooperates a movable slider (19) containing in a coordinated position a hole (25b) cooperating with a pivot (12) associated with the transverse vertical hole (25a) of the cam element (13), the movable slider (19) including at an intermediate position a second stirrup-shaped seating (20), in which is fitted coaxially a hollow cylindrical element (21) closed at one end and having that end (23) facing towards the exterior, the hollow cylindrical element (21) containing resilient contrast means (24) cooperating with the wall of the second stirrup-shaped seating (20) facing towards the end of the first longitudinal seating (16), the hollow cylindrical element (21) and the first longitudinal seating (16) including reciprocal anchorage means (17).

6 Claims, 2 Drawing Sheets

HINGE FOR SPECTACLES HAVING RESILIENT MECHANISM CONTAINED IN STATIONARY PART ASSOCIATED WITH FRAME

BACKGROUND OF THE INVENTION

This invention concerns a resilient hinge for spectacles.

The resilient hinge for spectacles is used in the field of the manufacture of spectacles and is employed to connect the frame, or part supporting the lenses, to the legs.

The invention is applied to any type of spectacles, whether they be spectacles for defective sight, for resting the eyes, sun-glasses, etc., made of any material such as a plastic, tortoise-shell, metal, etc.

Many systems have been disclosed for embodying the resilient hinges connecting the legs and frame of spectacles, these hinges possessing the feature of enabling the legs to be spread apart resiliently to a certain extent beyond the normal position of use so as to assist their user in the operations of putting on and taking off the spectacles.

These hinges have a stationary part and a movable part, each of which includes a terminal hole with which a pivot or screw cooperates during assembly for reciprocal clamping of the parts.

The hinges of the state of the art include a plurality of elements comprising at least one spring, a cam element and elements for attachment to the relative leg and frame, these elements being assembled longitudinally with each other.

These elements of necessity entail the use of components having an appreciable length and therefore being visible on the inner or outer side of the legs of the spectacles.

In the hinges of the state of the art the stationary part of the hinge generally comprises a cam element which is secured to the frame, whereas the movable part of the hinge comprises the other elements such as a spring, a slider, etc. which are assembled substantially in series.

In the hinges of the state of the art, owing to the considerable longitudinal size of the resilient mechanism associated with the hinge, this mechanism has to be applied to the movable part of the hinge associated with the leg and cannot be applied to the stationary part of the hinge associated with the frame.

The movable part of the hinge generally comprises an oblong containing body which is associated, for instance by means of screws or other known fixture systems, with the inner face of the end of the leg.

In these hinges of the state of the art the movable part therefore has a considerable longitudinal extent, which involves an aesthetic effect badly suited to certain models of frames.

Moreover, the great number of components forming the resilient hinge and contained in the containing body leads to a high cost due to the cost of the individual components in themselves but above all due to the assembly operations which require long times.

A hinge is known in which the body containing the movable part is associated with the frame, but this hinge is too high and protrudes too much and is only suitable for certain types of special frames.

SUMMARY OF THE INVENTION

The present applicants have designed, tested and embodied this invention to meet the ever more urgent requirements of the producers in this field and of the users and also to overcome these problems and to achieve further advantages.

The purpose of this invention is to provide a resilient hinge for spectacles which is not only simple, practical and strong but also has a considerably reduced lengthwise extent so that it can be applied to any type of spectacles and can be applied in particular to the frame.

The hinge according to the invention consists of a limited number of components with resulting savings as regards production, materials employed and energy used for its production and assembly.

The hinge according to the invention also requires assembly times much shorter than those required for hinges of the state of the art.

The hinge according to the invention, like the hinges of the state of the art, includes a stationary part and a movable part, and its resilient mechanism is contained in the stationary part of the hinge.

Since the stationary part of the hinge is associated with the frame of the spectacles, the structure of the legs is cleaner, simpler and lighter.

The hinge according to the invention arranges that the containing body constituting the stationary part of the hinge forms an integral part of the frame itself and is not an element independent of the frame.

This reduces considerably the number of parts and the times for assembly of the hinge according to the invention.

In the hinge according to the invention the containing body includes a first inner longitudinal seating into which is inserted a longitudinally movable slider, this slider containing in its outer terminal part a transverse vertical through hole.

At this transverse vertical through hole is fixed, so as to be free to rotate by a given angle, a cam element solidly associated with the end of the leg of the spectacles, this cam element having the purpose of providing for the leg at least a usage position and an inactive stored position.

The movable slider includes at an intermediate position a second stirrup-shaped seating closed at the sides and open transversely, in which is lodged a stationary hollow cylindrical element closed at one end.

This cylindrical element has its closed end facing towards the transverse vertical hole in the movable slider and has an opening facing towards the end of the first longitudinal seating in the containing body.

The cylindrical element is anchored to the first longitudinal seating in the containing body.

The cylindrical element contains contrast spring means which cooperate with the end of the second stirrup-shaped seating facing towards the end of the first longitudinal seating.

This inversion of the components enables the length of the stationary part of the hinge to be at least halved.

BRIEF DESCRIPTION OF THE DRAWINGS

The attached figures are given as a non-restrictive example and show two preferred embodiments of the invention as follows:

FIG. 5 shows a longitudinal section of a variant of the hinge of FIG. 1;

FIG. 6 shows a section of the hinge along the line C—C of FIG. 5;

FIG. 7 shows a section of the hinge along the line D—D of FIG. 5;

FIG. 10 gives a side view of the hollow cylindrical element of FIG. 2;

FIG. 11 is a front view of the hollow cylindrical element according to the arrow F of FIG. 10.

DETAILED DESCRIPTION OF THE PREFERRED EMBODIMENTS

Figure 1:
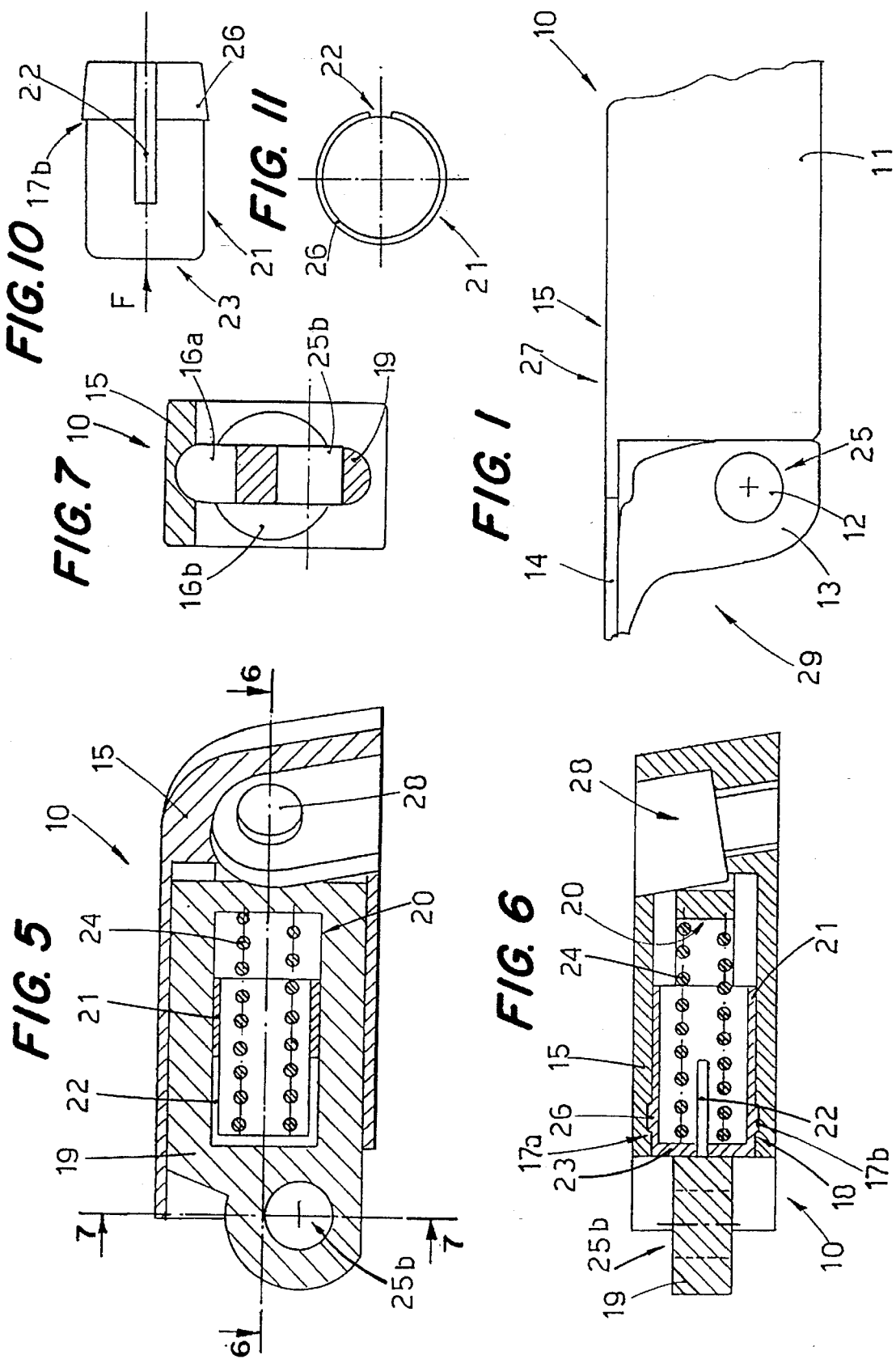
FIG. 1 gives a plan view of a resilient hinge according to the invention.
Figure 2:
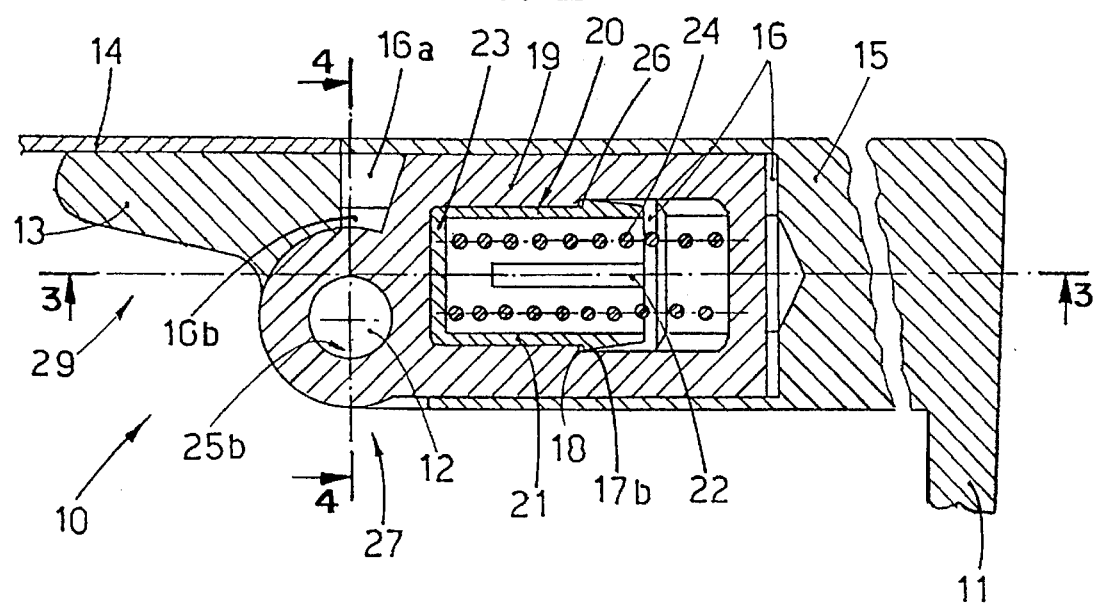
FIG. 2 shows a longitudinal section of the hinge of FIG. 1.
Figure 3:
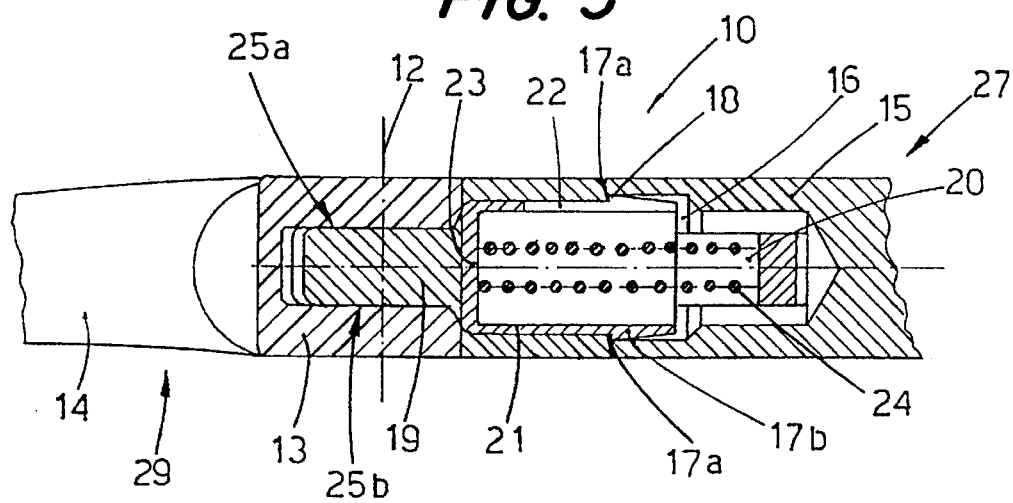
FIG. 3 shows a section of the hinge along the line A—A of FIG. 2.
Figure 4:
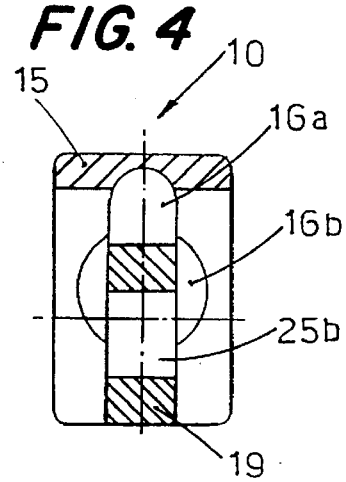
FIG. 4 shows a section of the hinge along the line B—B of FIG. 2.

The reference number 10 in the figures denotes generally a resilient hinge for spectacles according to the invention. The resilient hinge 10 according to the invention comprises a stationary part 27 and a movable part 29 coupled together by pivot means 12 cooperating with mating holes 25a and 25b located in coordinated positions in the respective movable 29 and stationary 27 parts.

The stationary part 27 of the hinge 10 in the resilient hinge 10 according to the invention is associated advantageously with a frame 11.

According to a variant the stationary part 27 is an integral part of the frame 11.

In the preferred embodiment the stationary part 27 is connected by a pivot 12 to the movable part 29 of the hinge 10; this movable part 29 comprises a cam element 13 containing a vertical transverse hole 25a and solidly associated with the end portion of the relative leg 14.

The stationary part 27 of the hinge 10 according to the invention includes an outer containing body 15 comprising a first inner longitudinal seating 16 open at its front end.

The containing body 15 in the hinge 10 according to the invention is an integral part of the frame 11, and in that body 15 is machined the first inner longitudinal seating 16 open at its front end.

In this case the first inner longitudinal seating 16 has a cross-section formed substantially as a slot 16a with a vertical axis and includes a central part 16b conformed as a containing seating with a circular section having a diameter greater than the width of the slot-shaped portion 16a.

The central circular part 16b of the first longitudinal seating 16 includes at an intermediate longitudinal position anchorage means 17a consisting of a circumferential groove means 18 in this case.

Moreover, the hinge 10 comprises a slider 19 movable longitudinally within the first containing seating 16 and containing at its end facing towards the outside of the first longitudinal seating 16 a vertical transverse hole 25b, with which there cooperates the pivot 12 for assembly of the leg 14.

The movable slider 19 includes a laterally open second stirrup-shaped seating 20, which contains a hollow cylindrical element 21 closed at one end and including peripheral anchorage means 17b, which consist in this case of a peripheral ridge 26.

The hollow cylindrical element 21 is positioned with its end wall 23 facing towards the exterior of the first longitudinal seating 16.

During assembly the anchorage means 17b cooperate with mating anchorage means 17a included in the central circular portion 16b of the first containing seating 16 in the containing body 15 so as to clamp the hollow cylindrical element 21 longitudinally against the containing body 15.

The resilient hinge 10 includes resilient contrast means 24 consisting in this case of a helicoidal spring positioned inside the hollow cylindrical element 21 and cooperating at one end with the closed end 23 of the hollow cylindrical element 21 and at its other end with the end wall of the second stirrup-shaped seating 20 facing towards the end of the first longitudinal seating 16.

The resilient contrast means 24 act in a direction so as to retract the slider 19 resiliently into the first longitudinal seating 16 when the leg 14 associated with the cam element 13 is displaced from its usage or inactive position.

In this case the hollow cylindrical element 21 comprises also a longitudinal notch 22, which enables the hollow cylindrical element 21 to be resiliently deformed so as to facilitate its fitting by longitudinal insertion within the central circular part 16b of the first longitudinal seating 16 of the containing body 15.

FIGS. 5, 6 and 7 show another form of embodiment of the hinge 10 according to the invention, in which the hollow cylindrical element 21 includes the anchorage means 17a in the frontal portion of the first longitudinal seating 16.

In this case the containing body 15 contains an inclined transverse hole 28 normally used to close the spectacles after installation of the lens.

Figure 8:
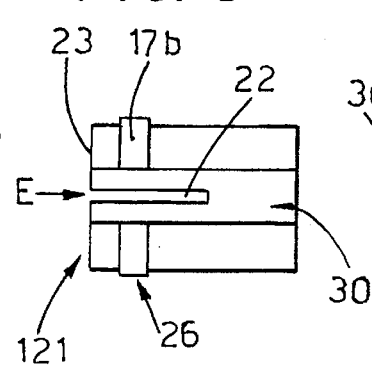
FIG. 8 shows a side view of a variant of the hollow cylindrical element of FIG. 6.
Figure 9:
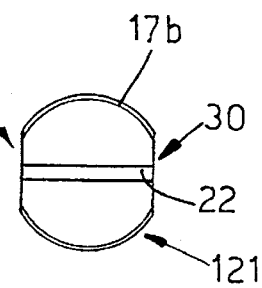
FIG. 9 shows a front view of the hollow cylindrical element according to the arrow E of FIG. 8.

According to another variant shown in FIGS. 8 and 9 the hollow cylindrical element 121 includes rotation-prevention means consisting of longitudinal flattened portions 30 which cooperate with mating flattened portions included in the central circular part 16b of the first longitudinal seating 16.

In this case the notch 22 is provided in the flattened portions 30 so as to prevent the possible entry of dust or dirt in general into the first longitudinal seating 16 through the notch 22.

I claim:

1. Resilient hinge for spectacles to connect the legs and frame in a pair of spectacles, the hinge including a stationary part associated with the frame and a movable part associated with the leg, the movable part comprising a cam element containing terminally a vertical transverse through hole, the stationary part comprising a containing body defining a first internal longitudinal seating, with which there cooperates a movable slider containing in a coordinated position a hole cooperating with a pivot associated with the transverse vertical hole of the cam element, the hinge being characterised in that the movable slider includes at an intermediate position a second stirrup-shaped seating, in which is fitted coaxially a hollow cylindrical element closed at one end and having that end facing towards the exterior, the hollow cylindrical element containing resilient contrast means cooperating with the wall of the second stirrup-shaped seating facing towards the end of the first longitudinal seating, the hollow cylindrical element and the first longitudinal seating including reciprocal anchorage means.

2. Resilient hinge as in claim 1, in which the containing body defining the first inner longitudinal seating is an integral part of the frame.

3. Resilient hinge as in claim 1, in which the reciprocal anchorage means comprise groove means and ridge means.

4. Resilient hinge as in claim 1, in which the hollow cylindrical element includes at least one longitudinal notch.

5. Resilient hinge as in claim 1, in which the first longitudinal seating has a cross-section formed substantially as a slot.

6. Resilient hinge as in claim 1, in which rotation-prevention means are included between the hollow cylindrical element and the first longitudinal seating.

* * * * *